March 7, 1967   F. REIFENHAUSER   3,307,218
APPARATUS FOR FORMING THIN PLASTIC TUBING
Filed Jan. 31, 1964   2 Sheets-Sheet 1

INVENTOR
FRITZ REIFENHAUSER
BY
Tilberry & Body
ATTORNEYS

March 7, 1967 F. REIFENHAUSER 3,307,218
APPARATUS FOR FORMING THIN PLASTIC TUBING
Filed Jan. 31, 1964 2 Sheets-Sheet 2
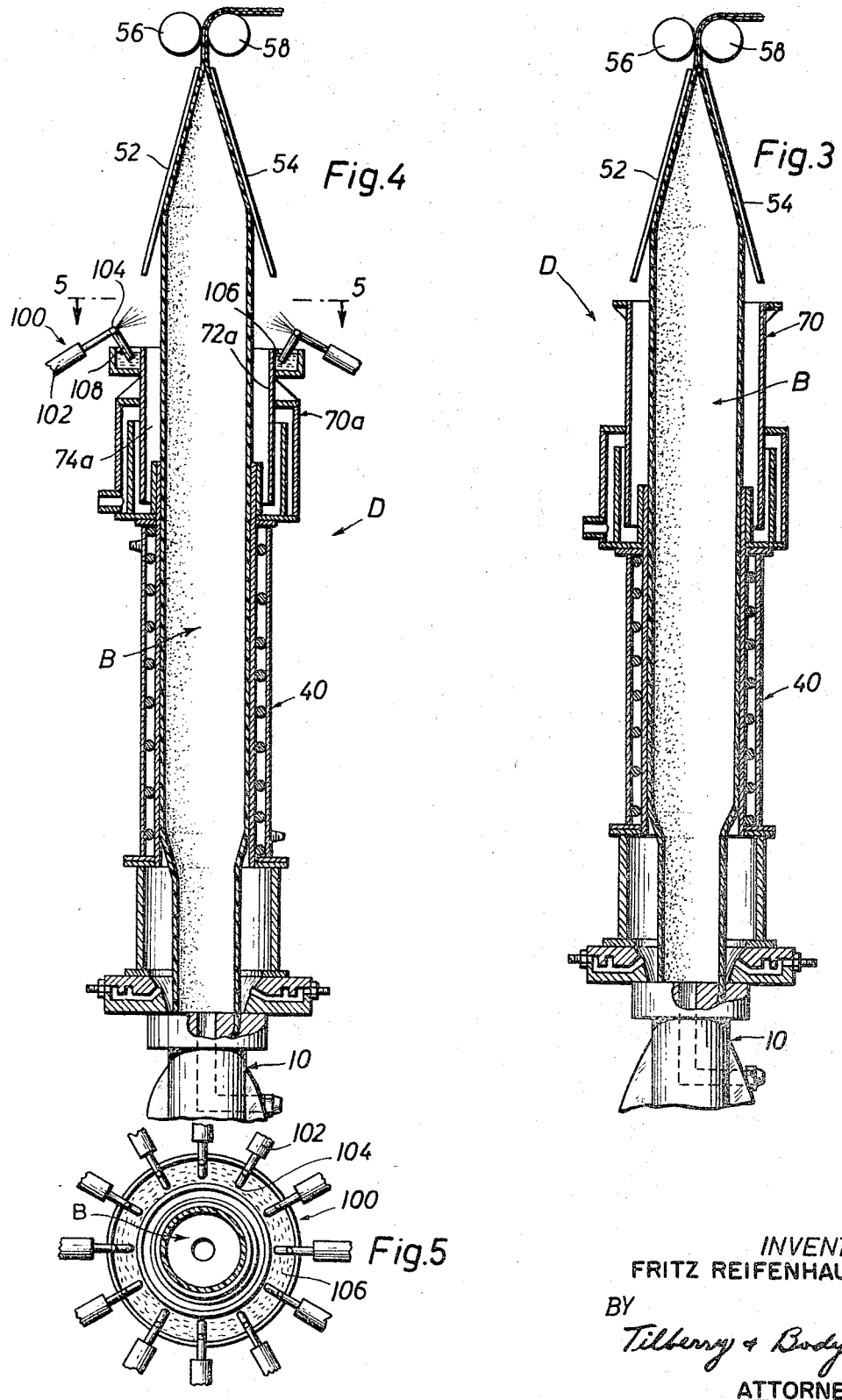
INVENTOR
FRITZ REIFENHAUSER
BY
Tilberry & Body
ATTORNEYS 3,307,218
APPARATUS FOR FORMING THIN
PLASTIC TUBING
Fritz Reifenhauser, Troisdorf, Germany, assignor to
Reifenhauser K.G., Troisdorf, Germany
Filed Jan. 31, 1964, Ser. No. 341,646
Claims priority, application Germany, Feb. 11, 1963,
R 34,424
2 Claims. (Cl. 18—14)

This invention pertains to the art of forming plastic and more particularly to an apparatus for forming thin plastic tubing.

The invention is particularly applicable to an apparatus for forming thin plastic tubing of the type which is extruded, inflated to the proper size and then folded, preparatory to being coiled onto a reel for subsequent use and it will be described with particular reference thereto; however, it will be appreciated that the invention has much broader applications and may be used for forming other types of inflated thin plastic tubing.

The term "thin plastic tubing" is used herein to indicate that the wall thickness and plastic material used for the tubing is so selected that the resulting tubing can be easily collapsed or folded and then coiled onto a reel after it has cooled to room temperature. This type of tubing is distinguished in the art of forming plastics from heavy walled tubing which has a relatively large wall thickness and, generally, maintains its shape after it has been cooled to room temperature. Such heavy walled tubing is used for piping or electrical conduits. Since "thin plastic tubing" will collapse by its own weight during cooling, or even after cooling to room temperature, the manufacturing problems and principles are different than those found in producing the heavy walled plastic tubing.

In producing thin plastic tubing, of the type to which the present invention is directed, a tubular element of the material is extruded in a vertical direction and this element is inflated to the proper size. In producing heavy walled plastic tubing, the tubing is extruded horizontally to approximately the proper size and a vacuum or gas pressure is used for sizing the tubing to the proper external dimensions. In other words, thin plastic tubing is inflated to change drastically the external dimensions, whereas heavy walled plastic tubing has the external dimensions changed only slightly for the purpose of maintaining a uniform external dimension. Thus, the inflation of the thin plastic tubing is primarily a forming step as opposed to primarily a sizing step. These two processes are somewhat different and these differences will be apparent from the following description of the present invention.

When forming either thin plastic tubing or heavy walled plastic tubing, the plastic material of the tubing is extruded at a temperature above the deformation of heat distortion temperature of the material. The deformation temperature of a plastic material is the temperature at which the material may be plasically deformed with a minimum of deforming force. This temperature is substantially below the liquid phase temperature of the plastic material. While the plastic tubing is at a temperature above the deformation temperature, but below the liquid phase temperature, the tubing may be inflated with only a slight amount of gas pressure without creating noticeable internal stresses within the tubing. After the tubing has been cooled below the deformation temperature the tubing tends to maintain its dimensional characteristics, with the exception of minor shrinkage during further cooling of the material. In summary, plastic tubing can be easily formed by gas inflation when the plastic material is above the deformation temperature and below the liquid phase temperature. This characteristic of the plastic material is well known in the art of plastics and further discussion of the rheology involved is not necessary.

In the past, thin plastic tubing was formed by first vertically extruding a thin walled tubular element at a temperature above the heat deformation temperature of the plastic forming the element; inflating the element to the desired dimensions; and then cooling the inflated plastic element by internal or external circulation of cooling air. After the inflated tubular element was cooled below the heat deformation point, the element was folded and coiled onto a reel for subsequent use. Such a method presented various disadvantages. For instance, the inflation of the plastic tubular element was accomplished by forcing air into the tubular element. The amount of inflation and, thus, the dimensions of the tubing, were governed primarily by the air pressure in relation to atmospheric pressure. This presented difficulties in maintaining the desired external dimensions of the thin plastic tubing. In addition, since the tubular element had very little physical strength, the extrusion had to be done in the vertical direction so that the walls of tubing would not collapse before the tubing reached a temperature below the deformation temperature. This vertical extrusion of the tubing limited somewhat the length of the forming apparatus; therefore, it was found that the air circulating within and outside of the plastic tubular element did not afford sufficient cooling to cool the plastic tubing substantially below deformation temperature. Thus, when the tubing was subsequently folded and coiled onto a reel, the tackiness of the internal surfaces of the tubular element caused the element to stick together. To overcome this disadvantage, it became common practice to decrease the extrusion rate so that the plastic was cooled substantially below the deformation temperature before it was folded. This presented one obvious disadvantage. The rate of manufacturing was substantially decreased.

These disadvantages have been completely overcome by the present invention which is directed toward an apparatus for forming thin plastic tubing of the type which is to be inflated and then folded, when apparatus allows rapid manufacturing of the tubing and assures that the walls of the tubing will not stick together when the tubing is collapsed and coiled onto a reel.

In accordance with the present invention, there is provided an apparatus for forming a thin folded plastic tubing comprising means for vertically extruding a tubular element of thin plastic material at a temperature above its deformation temperature, means for inflating the tubular element with a gas at a pressure above atmospheric pressure before the element cools below the deformation temperature, a sizing and cooling sleeve adjacent the exit end of the extruder means and surrounded the tubular element, the sleeve having an inner sizing and cooling surface with a peripheral shape corresponding to the desired final peripheral shape of the plastic tubing and the surface having a length sufficient to cool the element below the plastic deformation temperature, the sleeve having a cooling chamber in heat exchange relationship with the inner surface, and means on the end of the sleeve opposite the extruder means for folding the cooled tubular element.

In accordance with another aspect of the present invention, there is provided an apparatus for forming thin plastic tubing comprising means for extruding a tubular element of thin plastic material at a temperature above its deformation temperature, means for inflating the tubular element with a gas before the element cools below the deformation temperature, means for forming a film of cooling gas around a substantial length of the tubular element before the element is inflated to a peripheral shape substantially greater than the desired final peripheral shape of the plastic tubing, the film forming means including means for circulating gas along the length of the tubular element at a high velocity and a pressure near the pressure of the gas within the tubular element, the film of gas having a uniform small radial thickness for the substantial length of the tubular element to maintain the peripheral shape of the tubular element at the desired final peripheral shape of the plastic tubing.

In accordance with still a further aspect of the present invention, there is provided an apparatus for forming plastic tubing comprising means for extruding a tubular element of thin plastic material at a temperature above its deformation temperature, means for inflating the tubular element with a gas before the element cools below the deformation temperature, means for cooling the element below the deformation temperature while the peripheral shape of the element is maintained at the desired final peripheral shape of the plastic tubing, means for spraying coolant fluid against the outer surface of the tubular element after the element has been cooled below the deformation temperature.

The primary object of the present invention is the provision of an apparatus for forming a thin inflated plastic tubing, which apparatus controls the peripheral shape of the tubing and allows rapid forming of the tubing.

Another object of the present invention is the provision of an apparatus for forming a thin inflated plastic tubing, which apparatus cools the plastic tubing substantially below the deformation temperature of the plastic forming the tubing so that the tubing may be folded and coiled onto a reel without sticking or adhesion of the inner surfaces of the tubing when it is collapsed.

Still another object of the present invention is the provision of an apparatus for forming a thin inflated plastic tubing, which apparatus includes a cooled sizing surface against which the tubing is inflated to control the peripheral shape of the final tubing.

Yet another object of the present invention is the provision of an apparatus for forming a thin inflated plastic tubing, which apparatus includes a controlled film of pressurized gas surrounding the inflated tubing to control the peripheral shape of the final tubing.

Another object of the present invention is the provision of an apparatus for forming a thin inflated plastic tubing, which apparatus includes a spraying device for reducing the temperature of the tubing substantially below the deformation temperature of the plastic forming the tubing so that the tubing can be folded without sticking or adhesion of the inner surfaces of the tubing.

These and other objects and advantages will become apparent from the following description used to illustrate preferred embodiments of the invention as read in connection with the accompanying drawings in which:

FIGURE 3 is a cross-sectional, somewhat schematic, side elevational view showing a modification of the preferred embodiments of the invention as shown in FIGURES 1 and 2;

FIGURE 4 is a cross-sectional, somewhat schematic, side elevational view showing a further modification of the preferred embodiments of the invention as shown in FIGURES 1 and 2; and, FIGURE 5 is an enlarged, cross-sectional view, taken generally along line 5—5 of FIGURE 4.

Figure 1:
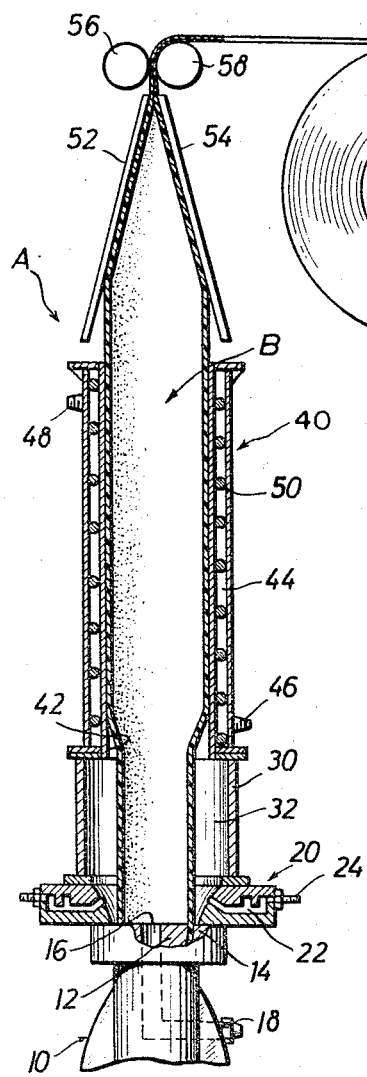
FIGURE 1 is a cross-sectional, somewhat schematic, side elevational view showing the preferred embodiment of the present invention.

Referring now to the drawings wherein the showings are for the purpose of illustrating preferred embodiments of the invention only and not for the purpose of limiting same, FIGURE 1 shows an apparatus A for forming an inflated thin plastic tubing of the type defined above. The apparatus includes an extruder of conventional construction having an inner core 12 and an outer die 14 defining an extrusion orifice for forming a tubular element B in a manner well known in the art of extruding plastics. Within the core 12 there is provided a nozzle 16 connected to a gas inlet 18 for directing pressurized gas into the interior of tubular element B for inflating the same to the desired final shape. Although a number of gaseous materials could be used for inflating the tubular element B, in practice air at pressure above atmospheric pressure is introduced through inlet 18 and nozzle 16 into the interior of the element B.

Immediately opposite the extruder 10 there is provided a manifold ring 20 having circumferentially positioned gas passages 22 connected with gas inlet 24. Above the manifold ring there is provided a cylindrical housing 30 defining, with the ring and the remainder of the apparatus, a chamber 32 for receiving gas from passages 22. In practice, air having a pressure substantially the same as the pressure within the interior of element B is introduced into the chamber 32. In this manner, the pressure of the gas within the element does not tend to expand the element B as it first issues from the extruder 10. Slight variations in the pressure between the interior of the element B and chamber 32 will not adversely affect the operation of the apparatus A.

Adjacent chamber 32 there is provided a sleeve 40 having a sizing and cooling surface 42 with dimensions corresponding to the desired final dimensions to be imparted to tubular element B. Since the tubular element is cooled as it moves along the surface 42, in a manner hereinafter to be described in detail, the tubular element B tends to shrink as it moves along the surface. Thus, the surface 42 may be slightly tapered in an inward direction away from the extruder 10 so that the element B will remain in heat exchange contact with the surface 42 even though it shrinks slightly during its movement through the sleeve 40. To cool the surface 42 there is provided, in accordance with the preferred embodiment of the present invention, a cooling chamber 44 surrounding the surface 42 and having coolant inlet 46 and coolant outlet 48. Within the chamber 44 there is provided a spiral baffle 50 so that coolant flowing from inlet 46 to outlet 48 will travel in a spiral path upwardly through the chamber 44. In this manner, the coolant is at a lower temperature adjacent the lower end of sleeve 40 and at a higher temperature adjacent the upper end of the sleeve. This allows maximum cooling near the entrant end of sleeve 40.

Spaced upwardly from the uppermost end of the sleeve 40 there is provided angularly disposed collapsing or folding plates 52, 54 for smoothly and gradually collapsing tubular element B. Immediately above the collapsing plate there is provided guide rolls 56, 58 for directing the collapsed tubular element B to the reel 60 where it is coiled for subsequent use.

In operation of the apparatus as disclosed in FIGURE 1, the tubular element B is extruded at a temperature above the deformation temperature of the plastic forming the tubular element and below the liquid phase temperature. Thus, the plastic can be easily deformed by slight force differentials between the interior and exterior of the tubular element. The gas issuing from nozzle 16 is at a pressure above atmospheric pressure; however, the gas within chamber 32 is also near the same pressure. For this reason, the tubular element B is not expanded or inflated while moving through chamber 32. When the tubular element reaches the sleeve 40, the gas within the tubular element expands the element against the sizing and cooling surface 42. This surface is cooler at the lower end of the sleeve so that rapid cooling of the element B takes place when the element first contacts the surface 42. Pressurized gas within the tubular element maintains the element in close heat exchange contact with the surface 42 as the tubular element moves through sleeve 40. In this manner, the temperature of the tubular element is gradually decreased. The length of surface 42 is chosen so that, with a predetermined longitudinal speed of element B, the element will leave the sleeve 40 at a temperature substantially below the deformation temperature of the plastic forming the element. Thus, when the element is collapsed by the plates 52, 54 there is no tendency for adhesion of the inner surfaces within the tubular element.

By utilizing an apparatus constructed in accordance with the embodiment of the invention shown in FIGURE 1, the tubular element B can be extruded and cooled at a rate faster than heretofore possible. In addition, by providing the cooling sizing surface 42 extending along a substantial length of the tubular element B, the peripheral dimension of the final plastic tubing can be maintained within close tolerances. This is another substantial advance over prior devices for inflating thin plastic tubing. In the past, the external dimensions of the inflated tubing were controlled only by the pressure of the gas within the heated element.

Figure 2:
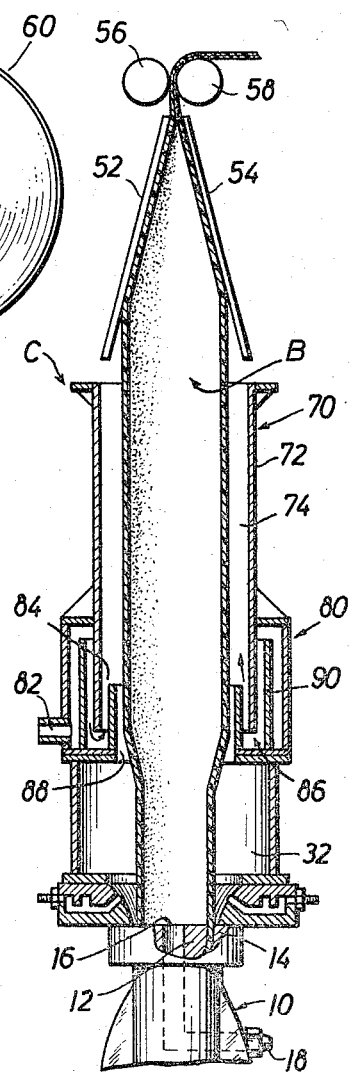
FIGURE 2 is a cross-sectional, somewhat schematic, side elevational view showing another preferred embodiment of the present invention.

Referring now to FIGURE 2, another embodiment of the present invention is disclosed wherein apparatus C for forming an inflated, thin plastic tube includes the extruder 10 that produces the thin tubular element B. Apparatus C provides a sleeve 70 surrounding tubular element B for cooling the element substantially below the deformation temperature of the material forming the element before it is folded by plates 52, 54 and guided by rolls 56, 58 onto a reel, not shown. In accordance with this embodiment of the present invention, the sleeve 70 includes a longitudinally extending cylinder 72 spaced radially from the outside surface of element B to form an annular space 74 for a purpose to be hereinafter described in detail. Adjacent the lower end of sleeve 70 there is provided a manifold 80 having a plurality of circumferentially spaced gas inlets 82, only one of which is shown, for introducing pressurized gas through an orifice 84 into the annular space 74. The orifice 84 has a shape corresponding generally to the shape of space 74, which in turn is dimensioned to correspond with the desired final shape to be imparted to tubular element B.

If gas were introduced directly to the orifice 84 from space inlet 82, variation in the pressure around the circumference of tubular element B would exist at the lower end of cylinder 72. To provide an even distribution of air within the annular space 74, a gas diffuser 86 is provided which diffuser includes the lower end of cylinder 72, inner cylinder 88 and outer cylinder 90. Gas, which in practice is air, under pressure is introduced into the inlet 82 and follows the path indicated by the arrow in FIGURE 2 before it issues from the orifice 84. This tortuous path followed by the pressurized air tends to equalize the distribution of the air around the element B as the air enters into the space 74. Thus, the space 74 is provided with an annular column of film of cooling gas which moves upwardly through the space with a high velocity and a pressure corresponding substantially to the pressure within the element B. This balance of pressure tends to hold the peripheral shape of tubular element B within preselected limits while it is cooled substantially below the deformation temperature of the material forming the tubular element B. The high velocity of the air or gas passing upwardly through the space 74 conducts a substantial amount of heat energy from the outer surface of the tubular element B so that the element is cooled efficiently.

To increase the cooling effect of sleeve 70 adjacent the lower end which initially receives the tubular element B, the manifold 80 has inner cylinder 88 which is in close heat exchange contact with the first portion of the tubular element B to enter the sleeve 70. The cool gas or air circulating through the manifold 80 maintains this inner cylinder at a substantially decreased temperature and the bulk of air in the manifold assists in the cooling function of the cylinder 88. It is appreciated that further cooling could be accomplished by providing a cooling chamber around cylinder 70 similar to cooling chamber 44 of sleeve 40.

The operation of apparatus C does not differ materially from the operation of apparatus A as shown in FIGURE 1; however, the space 74 serves the function of the cooling and sizing surface 42 of apparatus A.

In some instances it is desirable to provide a shorter plastic forming apparatus or a faster rate of extrusion; therefore, it is within the contemplation of the present invention to combine sleeve 40, shown in FIGURE 1, and sleeve 70, shown in FIGURE 2, in series along the length of the element B with, preferably, the sleeve 40 below the sleeve 70. Such an apparatus is shown in FIGURE 3 and is designated as D. The operation of this apparatus does not differ substantially from the operation of the apparatuses shown in FIGURES 1 and 2 and further description is not necessary.

Referring to FIGURES 4 and 5, there is illustrated a further modification of the present invention which is adapted for cooling tubular element B even more rapidly than the embodiment of the invention shown in FIGURE 3. This apparatus is designated as apparatus D and includes a sleeve 40, as shown in FIGURE 1, spaced from extruder 10 and a sleeve 70a, which corresponds in construction with sleeve 70 shown in FIGURE 2, but has a shorter cylinder 72a and annular space 74a. Adjacent the uppermost portion of the cylinder 72a there is provided a coolant spraying means 100 including a plurality of circumferentially spaced spraying devices 102 having nozzles 104 directed toward the outer surface of upwardly moving element B. Below the nozzles 104 there is provided an annular tank 106 filled with a coolant and into which aspiration tubes 108 of devices 102 extend. In operation, air is passed through spray devices 102 and from nozzles 104 against the outer surface of tubular element B. This air aspirates coolant from tank 106 through tubes 108 so that the coolant is carried by the air stream to the outer surface of element B.

The tubular element B, as it issues from the sleeve 70a, is below the deformation temperature of the plastic forming the element; however, to assure that no adhesion will take place when the walls of the element B are collapsed, the spraying means 100 further reduces the temperature of the moving element B. Since the tubular element B is below the deformation temperature as it leaves the sleeve 70a, there is no tendency to reduce the peripheral dimensions of the element B by the spraying means 100, except for slight shrinkage.

It is to be appreciated that the spraying means 100 may take a variety of structural embodiments and may be used with only sleeve 40, only sleeve 70, only sleeve 70a or a combination thereof without departing from the intended spirit and scope of the present invention. This spraying means 100 assures a substantial reduction in the temperature of the tubular element as it passes into the collapsing or folding plates 52, 54 for positively preventing adherence of the collapsed tubular element.

The present invention has been described in connection with certain structural embodiments; however, it is appreciated that various structural changes may be made in these embodiments without departing from the intended spirit and scope of the present invention as defined in the appended claims.

Having thus defined my invention, I claim:

1. In an apparatus for forming folded plastic tubing comprising means for vertically extruding a tubular element of thin plastic material at a temperature above its deformation temperature and below its liquid phase temperature, means for inflating said tubular element with a gas at a pressure above atmospheric pressure before said element cools below said deformation temperature, a sizing and cooling sleeve adjacent the exit end of said extruder means and surrounding said extruded tubular element, said sleeve having an inner sizing and cooling surface with a peripheral shape corresponding to the desired final peripheral shape of said plastic tubing and said surface having a length sufficient to cool said element below said plastic deformation temperature, said sleeve having a cooling chamber in heat exchange relationship with said inner surface, the improvement comprising: said sleeve being spaced from said extruding means by a chamber surrounding said tubular element and having inner dimensions greater than those of said sizing sleeve, and means for filling said chamber with a gas at a pressure substantially the same as the gas pressure used to inflate said tubing.

2. The improvement as defined in claim 1 including means for forming a film of cooling gas around a substantial length of said tubular element before it issues from said sizing and cooling sleeve, film forming means including a fluid supply, separate from said chamber filling means, for circulating gas along said length of said tubular element.

References Cited by the Examiner
UNITED STATES PATENTS

| | | | |
|---|---|---|---|
| 2,641,022 | 6/1953 | Kress | 18—14 X |
| 2,753,596 | 7/1956 | Bailey | 18—14 X |
| 2,902,716 | 7/1959 | Colombo | 18—14 |
| 2,947,031 | 8/1960 | Ho Chow et al. | 18—14 X |
| 2,947,032 | 8/1960 | Taylor | 18—14 |
| 3,008,186 | 11/1961 | Voigt | 18—14 |
| 3,064,905 | 10/1962 | Bonner | 18—14 X |
| 3,144,494 | 8/1964 | Gerow | 18—14 X |
| 3,167,814 | 2/1965 | Corbett | 18—14 |

WILLIAM J. STEPHENSON, *Primary Examiner.*